United States Patent
Cao

(10) Patent No.: US 10,871,862 B2
(45) Date of Patent: Dec. 22, 2020

(54) TOUCH FORCE DETECTING METHOD AND APPARATUS, TOUCH PANEL AND DISPLAY APPARATUS

(71) Applicant: BOE TECHNOLOGY GROUP CO., LTD., Beijing (CN)

(72) Inventor: Xueyou Cao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 315 days.

(21) Appl. No.: 15/765,838

(22) PCT Filed: Sep. 25, 2017

(86) PCT No.: PCT/CN2017/103083
§ 371 (c)(1),
(2) Date: Apr. 4, 2018

(87) PCT Pub. No.: WO2018/161537
PCT Pub. Date: Sep. 13, 2018

(65) Prior Publication Data
US 2019/0113998 A1    Apr. 18, 2019

(30) Foreign Application Priority Data

Mar. 10, 2017  (CN) .......................... 2017 1 0144386

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01); *G06F 3/0418* (2013.01);
(Continued)

(58) Field of Classification Search
CPC ...... G06F 3/044; G06F 3/0418; G06F 3/0416; G06F 2203/04104; G06F 2203/04105
See application file for complete search history.

(56) References Cited

U.S. PATENT DOCUMENTS

2013/0328790 A1   12/2013  Liu et al.
2017/0123549 A1*   5/2017  Guenard ............... G06F 1/1601
(Continued)

FOREIGN PATENT DOCUMENTS

CN         104236763 A        12/2014
CN         105607775 A         5/2016
(Continued)

OTHER PUBLICATIONS

International Search Report dated Jan. 2, 2018 issued in corresponding International Application No. PCT/CN2017/103083.
(Continued)

*Primary Examiner* — Amr A Awad
*Assistant Examiner* — Maheen I Javed
(74) *Attorney, Agent, or Firm* — Nath, Goldberg & Meyer; Joshua B. Goldberg

(57) ABSTRACT

The present disclosure provides a touch force detecting method and apparatus, a touch panel and a display apparatus. The touch force detecting method comprises: Step S1, obtaining the number N of touch points on a panel to be detected, where N is an integer greater than or equal to 1; Step S2, selecting M test positions arbitrarily on the panel to be detected, where M is an integer greater than or equal to N, and obtaining an amount of capacitance change at each of the test positions; Step S3, obtaining a panel deformation amount at each of the test positions according to the amount of capacitance change at each of the test positions; and Step S4, calculating a touch force at the touch point according to a correspondence between the panel deformation amount and the touch force.

12 Claims, 4 Drawing Sheets

(52) U.S. Cl.
CPC .. *G06F 3/0447* (2019.05); *G06F 2203/04104* (2013.01); *G06F 2203/04105* (2013.01)

(56) References Cited

U.S. PATENT DOCUMENTS

2017/0205937 A1    7/2017  Zhang et al.
2019/0121465 A1*   4/2019  Seo ..................... G01L 9/0072

FOREIGN PATENT DOCUMENTS

| | | |
|---|---|---|
| CN | 105677130 A | 6/2016 |
| CN | 106020555 A | 10/2016 |
| CN | 106919289 A | 7/2017 |

OTHER PUBLICATIONS

Office Action dated Apr. 4, 2018 issued in corresponding Chinese Application No. 201710144386.7.

* cited by examiner

TOUCH FORCE DETECTING METHOD AND APPARATUS, TOUCH PANEL AND DISPLAY APPARATUS

CROSS-REFERENCE TO RELATED APPLICATION

This is a National Phase Application filed under 35 U.S.C. 371 as a national stage of PCT/CN2017/103083, filed Sep. 25, 2017, an application claiming the benefit of Chinese Application No. 2017/10144386.7, filed Mar. 10, 2017, the disclosure of which is incorporated herein in its entirety by reference.

TECHNICAL FIELD

The present disclosure relates to the technical field of display technology, and particularly relates to a touch force detecting method and apparatus, a touch panel and a display apparatus.

BACKGROUND OF THE INVENTION

Capacitive touch screens detect touch positions by capturing capacitance changes between electrodes. Specifically, since the human body is a conductor, when a finger approaches an electrode, the capacitance between the finger and the electrode increases, and the touch position can be determined by detecting an amount of capacitance change.

At present, a touch panel usually adopts a flexible panel that can generate deformation. When one or more fingers press the flexible panel, the entire surface of the panel will have different degrees of deformation at various positions, resulting in difficulties in detection of the touch force magnitude of each finger.

SUMMARY

The present disclosure has been accomplished in order to at least partially solve the problems in the prior art. The present disclosure provides a touch force detecting method and apparatus, a touch panel and a display apparatus that realize touch force detection of one or more fingers.

According to one aspect of the disclosure, there is provided a touch force detecting method, the method comprising the steps of:

Step S1, obtaining the number N of touch points on a panel to be detected, where N is an integer greater than or equal to 1;

Step S2, selecting M test positions arbitrarily on the panel to be detected, where M is an integer greater than or equal to N, and obtaining an amount of capacitance change at each of the test positions, where the amount of capacitance change is an amount of capacitance change between a sensing electrode and a reference electrode of the panel to be detected at the test position when the panel to be detected is touched;

Step S3, obtaining a panel deformation amount at each of the test positions according to the amount of capacitance change at each of the test positions; and Step S4, calculating a touch force at a touch point according to a correspondence between the panel deformation amount and the touch force.

In the Step S4, when N=1, and M=1 is taken, the touch force at the touch point may be calculated according to the following equation:

$$F = k\Delta w$$

where F is the touch force at the touch point; k is a deformation coefficient; $\Delta w$ is the panel deformation amount at the test position.

In the Step S4, when N≥2, and M≥2 is taken, the touch force at each of the touch points may be obtained by solving the simultaneous equations described below:

$$w_1 = \sum_i^N f_{i1} \times P_i$$

$$w_2 = \sum_i^N f_{i2} \times P_i$$

...

$$w_M = \sum_i^N f_{iM} \times P_i$$

where $w_1 \sim w_M$ are the panel deformation amounts at the first to M-th test positions; $P_i$ is the touch force applied alone at the i-th touch point on the panel to be detected, i=1, 2, ..., N; $f_{i1} \sim f_{iM}$ are deformation weights of $P_i$ at the first to M-th test positions, respectively.

In the Step S3, a back calculation can be performed according to the following equation to obtain the panel deformation amount at each of the test positions:

$$\Delta C_{FT} = \varepsilon A \frac{\Delta w}{w(w - \Delta w)}$$

where $\Delta C_{FT}$ is the amount of capacitance change; e is a dielectric coefficient; A is a unit area between the sensing electrode and the reference electrode; w is an original distance between the sensing electrode and the reference electrode; and $\Delta w$ is the panel deformation amount.

After the step S1 and before the step S3, the touch force detecting method may further include the step of:

excluding position information of N touch points on the panel to be detected.

The test position may include a point or a region with a preset area.

When N=2, and M=2, two of the touch points are symmetrically located near one pair of diagonal corners of the panel to be detected with respect to a center of the panel to be detected; and two of the test positions are located on both sides of the center with respect to the center of the panel to be detected and located near the other pair of diagonal corners of the panel to be detected, and distances between the two test positions and two center lines of the panel to be detected that are vertical to each other and pass through the center are different, respectively.

The sensing electrode may include a plurality of longitudinal electrode lines and a plurality of transverse electrode lines, the plurality of longitudinal electrode lines and the plurality of transverse electrode lines being interleaved with each other and located in different planes; and in the step S2, the amount of capacitance change at the test position is obtained based on a capacitance on an entire longitudinal/transverse electrode line.

The sensing electrode may include a plurality of longitudinal electrode lines and a plurality of transverse electrode lines, the plurality of longitudinal electrode lines and the plurality of transverse electrode lines being interleaved with each other and located in different planes; and in the step S2, the amount of capacitance change at the test position is obtained based on a capacitance on the longitudinal electrode line and the transverse electrode line corresponding to the test position.

The sensing electrode may include latticed electrode lines; and in the step S2, the amount of capacitance change at the test position is obtained based on a capacitance on the latticed electrode lines corresponding to the test position.

According to another aspect of the disclosure, there is provided a touch force detecting apparatus comprising:

a touch detection component, which is configured to obtain the number N of touch points on a panel to be detected, where N is an integer greater than or equal to 1;

a capacitance detection component, which is configured to select M test positions arbitrarily on the panel to be detected, where M is an integer greater than or equal to N, and obtain an amount of capacitance change at each of the test positions, where the amount of capacitance change is an amount of capacitance change between a sensing electrode and a reference electrode of the panel to be detected at the test position when the panel to be detected is touched; and a calculating component, which is configured to obtain a panel deformation amount at each of the test positions according to the amount of capacitance change at each of the test positions, and calculate a touch force at the touch point according to a correspondence between the panel deformation amount and the touch force.

According to still another aspect of the disclosure, there is provided a touch panel comprising the above mentioned touch force detecting apparatus.

According to still another aspect of the disclosure, there is provided a display apparatus comprising the above mentioned touch panel.

DETAILED DESCRIPTION

To improve understanding of the technical solution of the present disclosure for those skilled in the art, the touch force detecting method and apparatus, touch panel and display panel provided in the disclosure will be described below in detail in conjunction with the accompanying drawings.

Figure 1:
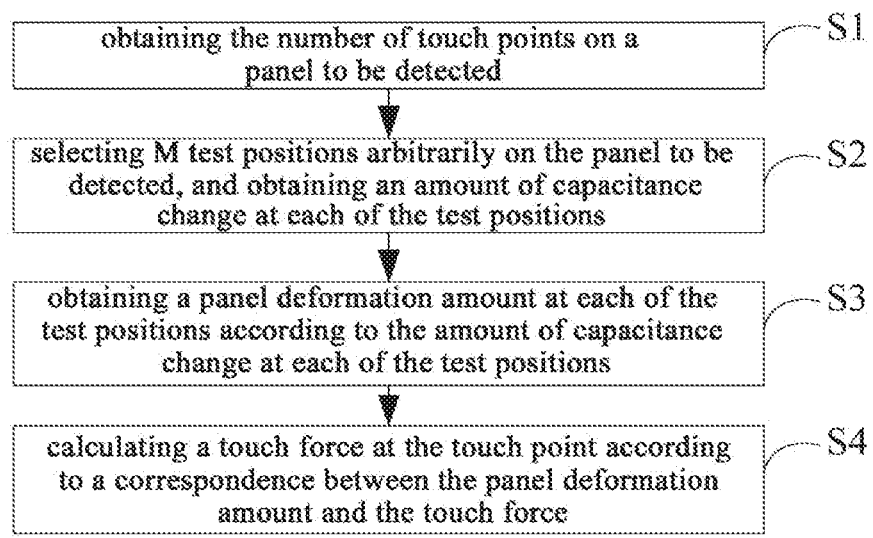
FIG. 1 is a flow chart showing a touch force detecting method according to an exemplary embodiment of the disclosure.

FIG. 1 is a flow chart showing a touch force detecting method according to an exemplary embodiment of the disclosure. According to one aspect of the disclosure, as shown in FIG. 1, this exemplary embodiment provides a touch force detecting method comprising the steps of:

Step S1, obtaining the number N of touch points on a panel to be detected, where N is an integer greater than or equal to 1.

The number of touch points can be obtained while detecting positions of the touch points.

Step S2, selecting M test positions arbitrarily on the panel to be detected, where M is an integer greater than or equal to N, and obtaining an amount of capacitance change at each of the test positions.

The test position may include a point or a region with a preset area.

Figure 2:
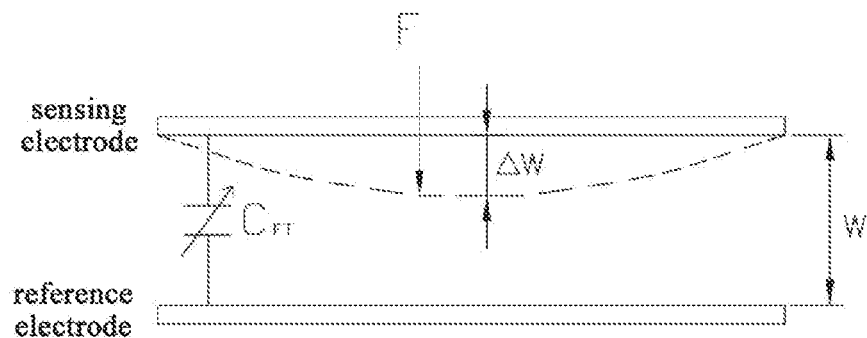
FIG. 2 is a schematic diagram showing deformation of a touch panel when a touch force is applied.

FIG. 2 is a schematic diagram showing deformation of a touch panel when a touch force is applied. As shown in FIG. 2, the touch panel has a sensing electrode which configures a capacitance $C_{FT}$ together with a reference electrode. When the reference electrode is ground, the sensing electrode configures a capacitance (self capacitance) with the ground. When the reference electrode and the sensing electrode are crossed transverse and longitudinal electrodes, a capacitance (mutual capacitance) is formed at a intersection.

When a touch force F is applied on the panel to be detected, the sensing electrode is deformed, an original distance w between the sensing electrode and the reference electrode is changed, and the deformation amount at any test position is $\Delta w$ so that the capacitance $C_{FT}$ between the sensing electrode and the reference electrode is changed at the test position, i.e., a certain amount of capacitance change occurs at the test position.

The method for obtaining an amount of capacitance change at each of the test positions will be described below in detail for sensing electrodes of different structures.

Figure 3A:
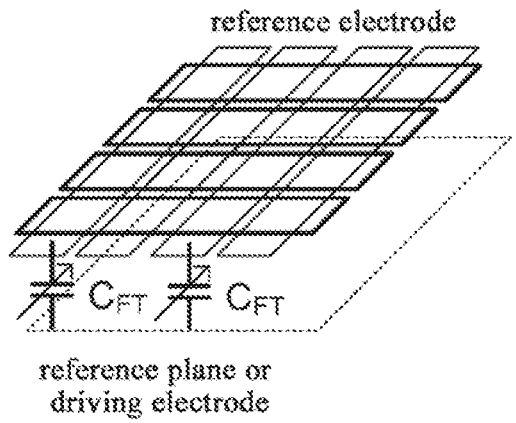
FIG. 3A is a structural schematic view showing a sensing electrode according to an exemplary embodiment of the disclosure.
Figure 3B:
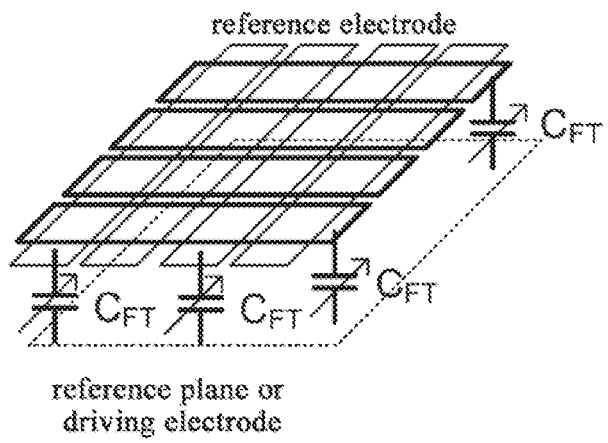
FIG. 3B is a structural schematic view showing another sensing electrode according to an exemplary embodiment of the disclosure.
Figure 3C:
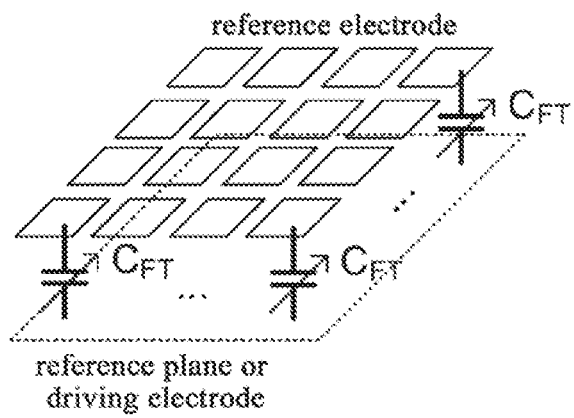
FIG. 3C is a structural schematic view showing still another sensing electrode according to an exemplary embodiment of the disclosure.

FIG. 3A is a structural schematic view showing a sensing electrode according to an exemplary embodiment of the disclosure. FIG. 3B is a structural schematic view showing another sensing electrode according to an exemplary embodiment of the disclosure. FIG. 3C is a structural schematic view showing still another sensing electrode according to an exemplary embodiment of the disclosure.

As shown in FIG. 3A, the sensing electrode includes a plurality of longitudinal electrode lines and a plurality of transverse electrode lines. The plurality of longitudinal electrode lines and the plurality of transverse electrode lines are interleaved with each other and located in different planes. Taking the reference electrode being ground as an example, the longitudinal electrode lines and the transverse electrode lines configure a capacitance $C_{FT}$ with the ground, respectively. In the step S2, the amount of capacitance change at the test position may be obtained based on a capacitance on an entire longitudinal electrode line without referring to a capacitance on the transverse electrode line so as to avoid inaccuracy in the detected capacitance data due to mutual blocking of the longitudinal electrode lines and the transverse electrode lines during detection of the capacitance on the two kinds of electrode lines. In this case, the capacitance on the entire longitudinal electrode line corresponding to the test position is regarded as a capacitance $C_{FT}$ at the test position. Obviously, the amount of capacitance change at the test position may also be obtained based on a capacitance on an entire transverse electrode line without referring to a capacitance on the longitudinal electrode line.

Alternatively, as shown in FIG. 3B, the sensing electrode includes a plurality of longitudinal electrode lines and a plurality of transverse electrode lines. The plurality of longitudinal electrode lines and the plurality of transverse electrode lines are interleaved with each other and located in different planes. Taking the reference electrode being ground as an example, the longitudinal electrode lines and the transverse electrode lines configure a capacitance $C_{FT}$ with the ground, respectively. In the step S2, the amount of capacitance change at the test position is obtained based on the capacitance $C_{FT}$ on the longitudinal electrode line and the transverse electrode line corresponding to the test position. Specifically, changes in the capacitance on the longitudinal electrode line and the lateral electrode line are detected before and after touching the panel respectively to determine horizontal and vertical coordinates of the touch point, and then combine them into a touch coordinates of the panel based on which an amount of capacitance change at each of the test positions is obtained.

Alternatively, as shown in FIG. 3C, the sensing electrode includes latticed electrode lines. In this structure, the capacitance $C_{FT}$ configured between the sensing electrode and the reference electrode covers the entire panel to be detected. Thus, in the step S2, the amount of capacitance change at each of the test positions can be obtained according to a touch position as long as the touch position is fixed.

Step S3, obtaining a panel deformation amount at each of the test positions according to the amount of capacitance change at each of the test positions.

As shown in FIG. 2, when a touch force F is applied on the panel to be detected, the sensing electrode is deformed, an original distance w between the sensing electrode and the reference electrode is changed, and the deformation amount Δw at any test position is the panel deformation amount.

In the exemplary embodiment of the disclosure, a back calculation can be performed according to the following equation to obtain the panel deformation amount at each of the test positions:

$$\Delta C_{FT} = \varepsilon A \frac{\Delta w}{w(w - \Delta w)}$$

where $\Delta C_{FT}$ is the amount of capacitance change; ε is a dielectric coefficient; A is a unit area between the sensing electrode and the reference electrode; w is an original distance between the sensing electrode and the reference electrode; and Δw is the panel deformation amount.

Here, $\Delta C_{FT}$ has been obtained in the step S2, the dielectric coefficient ε, unit area A and original distance w are known. Thus, by substituting these parameters into the above equation, a panel deformation amount Δw can be obtained through back calculation.

Step S4, calculating a touch force at the touch point according to a correspondence between the panel deformation amount and the touch force.

The panel deformation amount corresponds to the touch force. Using this correspondence, the touch force may be calculated after the panel deformation amount is obtained. The specific implementation of calculating the touch force using the correspondence between the panel deformation amount and the touch force is described below in detail.

Specifically, when N=1, i.e., when the panel to be detected is touched by one finger, since the entire panel to be detected will be deformed, it is not limited to the positions of the touch points. As a result, the touch force at the touch point may be calculated based on the deformation properties of the entire panel.

Based on the above principle, it may take M=1, i.e., selecting a point on the touch panel arbitrarily as the test position, and calculate a touch force at the touch point according to the following equation:

$$F = k\Delta w$$

where F is the touch force at the touch point; k is a deformation coefficient; and Δw is the panel deformation amount at the test position.

Here, the panel deformation amount Δw has been obtained in the step S3, the deformation coefficient k is known. Thus, the touch force F can be calculated by substituting these parameters into the above equation.

For a case where the panel to be detected are touched by a plurality of fingers, i.e., when N≥2, since the panel deformation amount and the touch force have a linear correspondence, when the panel to be detected are pressed under a plurality of forces, the deformation amount at any test position equals to a sum of deformation amounts of the panel to be detected under respective forces at a corresponding touch point alone.

Based on the above principle, it takes M≥2, and obtains the touch force at each of the touch points by solving the simultaneous equations described below:

$$w_1 = \sum_i^N f_{i1} \times P_i$$

$$w_2 = \sum_i^N f_{i2} \times P_i$$

...

$$w_M = \sum_i^N f_{iM} \times P_i$$

where $w_1 \sim w_M$ are the panel deformation amounts at the first to M-th test positions; $P_i$ is the touch force applied alone at the i-th touch point on the panel to be detected, i=1, 2, . . . , N; $f_{i1} \sim f_{iM}$ are deformation weights of $P_i$ at the first to M-th test positions, respectively.

In the following, with N=2 and M=2 as an example, the method for detecting a touch force on a multi-finger touch panel to be detected is described in detail.

Figure 4A:
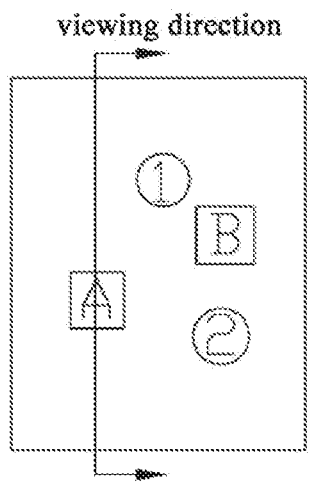
FIG. 4A is a schematic view showing a distribution of touch points and test positions according to an exemplary embodiment of the disclosure.
Figure 4B:
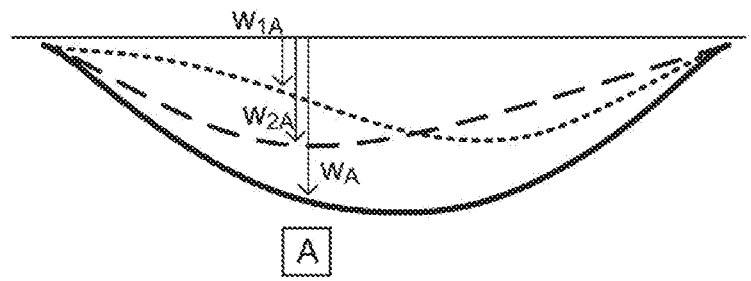
FIG. 4B is a deformation graph of the test position A in FIG. 4A in the viewing direction.

FIG. 4A is a schematic view showing a distribution of touch points and test positions according to an exemplary embodiment of the disclosure. FIG. 4B is a deformation graph of the test position A in FIG. 4A in the viewing direction.

As shown in FIGS. 4A and 4B, when a touch point 1 and a touch point 2 on the panel to be detected are subjected to two forces $P_1$ and $P_2$, respectively, a deformation amount at the test position A equals to a sum of deformation amounts applied by the forces $P_1$ and $P_2$ at their respective touch point 1 and touch point 2 independently. Similarly, a deformation amount at the test position B equals to a sum of deformation amounts applied by the forces $P_1$ and $P_2$ at their respective touch point 1 and touch point 2 independently. That is:

$$w_A = w_{1A} + w_{2A} \quad \text{(equation 1)}$$

$$w_B = w_{1B} + w_{2B} \quad \text{(equation 2)}$$

where $w_{1A}$ and $w_{1B}$ are the deformation amounts produced at the test position A and the test position B by the force $P_1$ applied on the touch point 1 independently; $w_{2A}$ and $w_{2B}$ are the deformation amounts produced at the test position A and the test position B by the force $P_2$ applied on the touch point 2 independently.

According to the equation $w=f \times p$, where p is a deformation amount; f is a deformation weight; and p is a force, the above equation 1 and equation 2 may be rewritten as:

$$w_A = f_{1A} \times P_1 + f_{2A} \times P_2 \quad \text{(equation 3)}$$

$$w_B = f_{1B} \times P_1 + f_{2B} \times P_2 \quad \text{(equation 4)}$$

where $f_{1A}$ and $f_{1B}$ are respectively the deformation weights at the test position A and the test position B when the force $P_1$ is applied on the touch point 1 independently; similarly, $f_{2A}$ and $f_{2B}$ are the deformation weights at the test position A and the test position B when the force $P_2$ is applied on the touch point 2 independently. A correspondence between the position of the touch point and the deformation weight is obtained while the step S1 is performed. For a case where the number of the test positions is greater than the number of the touch points, some of all the deformation weights may be selected to use according to specific conditions. In practical applications, the deformation weight may be recorded during processes such as sampling or mass production tests, and obtained through corresponding analysis or any other known method.

By solving the equations 3 and 4 described above together, two forces $P_1$ and $P_2$ respectively corresponding to the touch point 1 and the touch point 2 on the panel to be detected can be obtained.

The distribution of touch points and test positions are described below in detail.

Figure 5A:
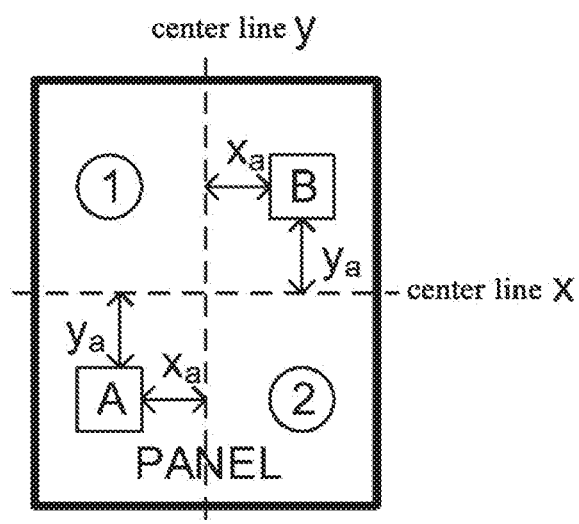
FIG. 5A is a schematic view showing a distribution of touch points and test positions according to an exemplary embodiment of the disclosure.
Figure 5B:
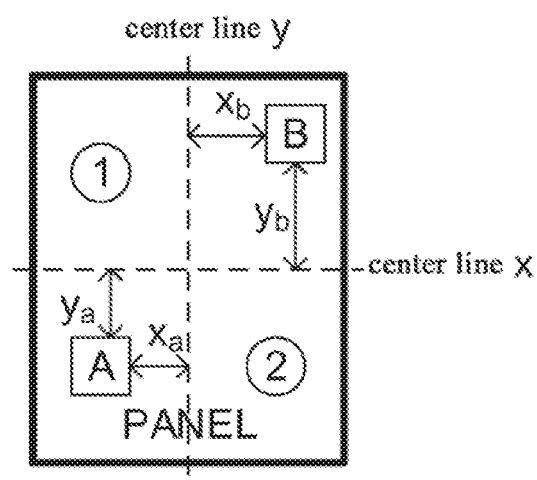
FIG. 5B is a schematic view showing another distribution of touch points and test positions according to an exemplary embodiment of the disclosure.
Figure 6:
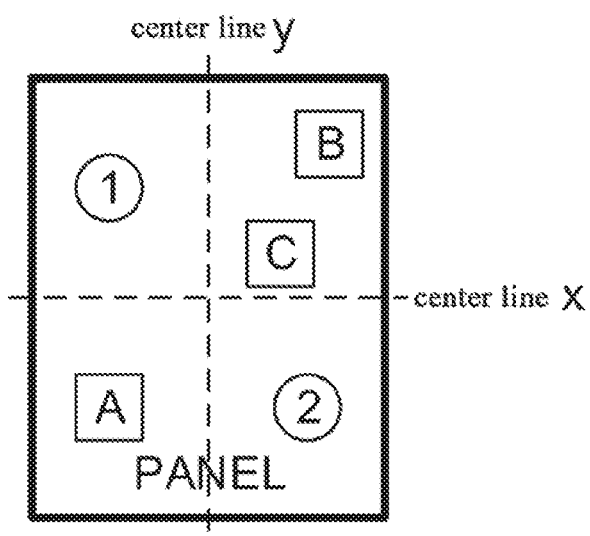
FIG. 6 is a schematic view showing still another distribution of touch points and test positions according to an exemplary embodiment of the disclosure.

FIG. 5A is a schematic view showing a distribution of touch points and test positions according to an exemplary embodiment of the disclosure. FIG. 5B is a schematic view showing another distribution of touch points and test positions according to an exemplary embodiment of the disclosure. FIG. 6 is a schematic view showing still another distribution of touch points and test positions according to an exemplary embodiment of the disclosure.

As shown in FIG. 5A, when N=2, and M=2, the touch points 1 and 2 are symmetrically located near one pair of diagonal corners of the panel to be detected with respect to a center of the panel to be detected. The test positions A and B are located on both sides of the center with respect to the center of the panel to be detected and located near the other pair of diagonal corners of the panel to be detected, and distances between the test positions A and B and two center lines of the panel to be detected that are vertical to each other and pass through the center are the same, respectively. Specifically, as shown in FIG. 5A, a distance between the test position A and a horizontal center line x is $y_a$, a distance between the test position A and a vertical center line y is $x_a$, a distance between the test position B and the horizontal center line x is $y_a$, and a distance between the test position B and the vertical center line y is $x_a$, where $x_a$ equals to $y_a$. In this case, it is easy to have infinitely many solutions.

In order to prevent infinitely many solutions, the distances between the test positions A and B and the two center lines may be set to be different, respectively. Specifically, as shown in FIG. 5B, a distance between the test position A and a horizontal center line x is $y_a$, a distance between the test position A and a vertical center line y is $x_a$, a distance between the test position B and the horizontal center line x is $y_b$, and a distance between the test position B and the vertical center line y is $x_b$, where $x_a$ does not equals to $y_a$ and $x_b$ does not equals to $y_b$, i.e., at least two of the above four distances are different.

In the exemplary embodiment of the disclosure, M>N is taken, so as to prevent the solution error being too large due to incorrect solution of values when the test position A and the test position B are touched. For example, as shown in FIG. 6, N=2 means that there are two touch points 1 and 2; M=3 means that there are three test positions A, B and C. In addition, for the case where the number of test positions is greater than the number of touch points, the above simultaneous equations may lead to multiple solutions, and then the average value of the solutions is taken.

In practical applications, the distribution manner of the test positions may be set arbitrarily according to actual conditions.

In the exemplary embodiment of the disclosure, after the step S1 and before the step S3, the touch force detecting method may further include the step of:

excluding position information of N touch points on the panel to be detected.

In practical applications, the position information of the N touch points on the panel to be detected may affect stability of the result of the detection method and increase difficulties in implementation of the detection method. Regarding this, the position information of the N touch points on the panel to be detected is excluded to avoid the above problem.

According to another aspect of the disclosure, there is provided a touch force detecting apparatus comprising a touch detection component, a capacitance detection component and a calculating component.

The touch detection component is configured to obtain the number N of touch points on a panel to be detected, where N is an integer greater than or equal to 1. In an exemplary embodiment of the disclosure, the touch detection component may also be implemented as a DSP chip or embedded chip. However, the touch detection component of the disclosure is not limited thereto, but may also be any other device or detection circuit capable of touch detection.

The number of touch points can be obtained while detecting positions of the touch points.

The capacitance detection component is configured to select M test positions arbitrarily on the panel to be detected, where M is an integer greater than or equal to N, and obtain an amount of capacitance change at each of the test positions, where the amount of capacitance change is an amount of capacitance change between a sensing electrode and a reference electrode of the panel to be detected at the test position when the panel to be detected is touched. In an exemplary embodiment of the disclosure, the capacitance detection component may also be implemented as a DSP chip or embedded chip. However, the capacitance detection component of the disclosure is not limited thereto, but may also be any other device or detection circuit capable of capacitance detection.

The calculating component is configured to obtain a panel deformation amount at each of the test positions according to the amount of capacitance change at each of the test positions, and calculate a touch force at the touch point according to a correspondence between the panel deformation amount and the touch force. In an exemplary embodiment of the disclosure, the calculating component may also be implemented as a DSP chip or embedded chip. However, the calculating component of the disclosure is not limited thereto, but may also be any other device or calculating circuit capable of calculation.

By selecting the M test positions arbitrarily on the panel to be detected and obtaining the amount of capacitance change at each of the test positions with the capacitance detection component, and obtaining the panel deformation amount at each of the test positions according to the amount of capacitance change and calculating a touch force at the touch point according to a correspondence between the panel deformation amount and the touch force with the calculating component, the touch force detection of one or more fingers is realized.

According to still another aspect of the disclosure, there is provided a touch panel comprising the touch force detecting apparatus of the disclosure.

With the above touch force detecting apparatus of the disclosure, the touch panel provided in the disclosure may realize the touch force detection of one or more fingers.

According to still another aspect of the disclosure, there is also provided a display apparatus comprising the above touch panel of the disclosure.

With the above touch panel of the disclosure, the display apparatus provided in the disclosure may realize the touch force detection of one or more fingers.

It should be understood that the above embodiments are merely exemplary embodiments for the purpose of illustrating the principle of the disclosure, and the disclosure is not limited thereto. Various modifications and improvements can be made by a person having ordinary skill in the art without departing from the spirit and essence of the disclosure. Accordingly, all of the modifications and improvements also fall into the protection scope of the disclosure.

What is claimed is:

1. A touch force detecting method, the method comprising the steps of:

Step S1, obtaining the number N of touch points on a panel to be detected, where N is an integer greater than 1;

Step S2, selecting M test positions arbitrarily on the panel to be detected, where M is an integer greater than or equal to N, and obtaining an amount of capacitance change at each of the test positions, where the amount of capacitance change is an amount of capacitance change between a sensing electrode and a reference electrode of the panel to be detected at the test position when the panel to be detected is touched;

Step S3, obtaining a panel deformation amount at each of the test positions according to the amount of capacitance change at each of the test positions; and Step S4, calculating a touch force at the touch point according to a correspondence between the panel deformation amount and the touch force, wherein in the Step S3, a back calculation is performed according to the following equation to obtain the panel deformation amount at each of the test positions:

$$\Delta C_{FT} = \varepsilon A \frac{\Delta w}{w(w - \Delta w)}$$

where $\Delta C_{FT}$ is the amount of capacitance change;
$\varepsilon$ is a dielectric coefficient;
A is a unit area between the sensing electrode and the reference electrode;
w is an original distance between the sensing electrode and the reference electrode; and
$\Delta w$ is the panel deformation amount.

2. The touch force detecting method according to claim 1, wherein in the Step S4, when N=1, and M=1 is taken, the touch force at the touch point is calculated according to the following equation:

$$F = k\Delta w$$

where F is the touch force at the touch point; k is a deformation coefficient; and $\Delta w$ is the panel deformation amount at the test position.

3. The touch force detecting method according to claim 1, wherein in the Step S4, when N≥2, and M≥2 is taken, the touch force at each of the touch points is obtained by solving the simultaneous equations described below:

$$w_1 = \sum_i^N f_{i1} \times P_i$$

$$w_2 = \sum_i^N f_{i2} \times P_i$$

$$\ldots$$

$$w_M = \sum_i^N f_{iM} \times P_i$$

where $w_1 \sim w_M$ are the panel deformation amounts at the first to M-th test positions; $P_i$ is the touch force applied alone at the i-th touch point on the panel to be detected, i=1,2, . . . ,N; $f_{i1} \sim f_{iM}$ are deformation weights of $P_i$ at the first to M-th test positions, respectively.

4. The touch force detecting method according to claim 1, wherein after the step S1 and before the step S3, the touch force detecting method further includes the step of:
excluding position information of N touch points on the panel to be detected.

5. The touch force detecting method according to claim 1, wherein the test position includes a point or a region with a preset area.

6. The touch force detecting method according to claim 1, wherein when N=2, and M=2, two of the touch points are symmetrically located near one pair of diagonal corners of the panel to be detected with respect to a center of the panel to be detected; and
wherein two of the test positions are located on both sides of the center with respect to the center of the panel to be detected and located near the other pair of diagonal corners of the panel to be detected, and distances between the two test positions and two center lines of the panel to be detected that are vertical to each other and pass through the center are different, respectively.

7. The touch force detecting method according to claim 1, wherein the sensing electrode includes a plurality of longitudinal electrode lines and a plurality of transverse electrode lines, the plurality of longitudinal electrode lines and the plurality of transverse electrode lines being interleaved with each other and located in different planes; and
wherein in the step S2, the amount of capacitance change at the test position is obtained based on a capacitance on an entire longitudinal/transverse electrode line.

8. The touch force detecting method according to claim 1,
wherein the sensing electrode includes a plurality of longitudinal electrode lines and a plurality of transverse electrode lines, the plurality of longitudinal electrode lines and the plurality of transverse electrode lines being interleaved with each other and located in different planes; and
wherein in the step S2, the amount of capacitance change at the test position is obtained based on a capacitance on the longitudinal electrode line and the transverse electrode line corresponding to the test position.

9. The touch force detecting method according to claim 1,
wherein the sensing electrode includes latticed electrode lines; and
wherein in the step S2, the amount of capacitance change at the test position is obtained based on a capacitance on the latticed electrode lines corresponding to the test position.

10. A touch force detecting apparatus comprising:
a touch detection component, which is configured to obtain the number N of touch points on a panel to be detected, where N is an integer greater than 1;
a capacitance detection component, which is configured to select M test positions arbitrarily on the panel to be detected, where M is an integer greater than or equal to N, and obtain an amount of capacitance change at each of the test positions, where the amount of capacitance change is an amount of capacitance change between a sensing electrode and a reference electrode of the panel to be detected at the test position when the panel to be detected is touched; and
a calculating component, which is configured to obtain a panel deformation amount at each of the test positions according to the amount of capacitance change at each of the test positions, and calculate a touch force at the touch point according to a correspondence between the panel deformation amount and the touch force
wherein a back calculation is performed according to the following equation to obtain the panel deformation amount at each of the test positions:

$$\Delta C_{FT} = \epsilon A \frac{\Delta w}{w(w - \Delta w)}$$

where $\Delta C_{FT}$ is the amount of capacitance change;
$\epsilon$ is a dielectric coefficient;
A is a unit area between the sensing electrode and the reference electrode;
w is an original distance between the sensing electrode and the reference electrode; and
$\Delta w$ is the panel deformation amount.

11. A touch panel comprising the touch force detecting apparatus according to claim 10.

12. A display apparatus comprising the display panel according to claim 11.

* * * * *